United States Patent [19]
Miller

[11] Patent Number: 5,351,326
[45] Date of Patent: Sep. 27, 1994

[54] METHOD OF AFFIXING OPTICAL FIBER TO COUPLER

[75] Inventor: William J. Miller, Corning, N.Y.

[73] Assignee: Corning Incorporated, Corning, N.Y.

[21] Appl. No.: 959,610

[22] Filed: Oct. 13, 1992

[51] Int. Cl.$^5$ .......................... G02B 6/36; G02B 7/26
[52] U.S. Cl. ..................................................... 385/43
[58] Field of Search ........................ 385/31, 42, 43, 51

[56] References Cited

U.S. PATENT DOCUMENTS

| | | | |
|---|---|---|---|
| 5,017,206 | 5/1991 | Miller et al. | 385/22 X |
| 5,131,735 | 7/1992 | Berkey et al. | 385/43 |
| 5,175,779 | 12/1992 | Mortimore | 385/43 |

FOREIGN PATENT DOCUMENTS 0486297 11/1991 European Pat. Off. .

Primary Examiner—Rodney B. Bovernick
Assistant Examiner—Robert E. Wise
Attorney, Agent, or Firm—William J. Simmons, Jr.

[57] ABSTRACT

A 1×N fiber optic coupler is formed by assembling a coupler preform including spacer tube means surrounded by an outer glass tube that is concentric with the spacer tube means. A first optical fiber is disposed in an axial bore in the spacer tube means, and N optical fibers are disposed within a gap between the spacer tube means and the outer tube, the first fiber and the N fibers extending through the midregion of the coupler preform. The midregion of the outer tube is heated to collapse it about the fibers, and the central portion of the midregion is stretched to reduce the diameter thereof over a predetermined length. In accordance with the invention, the spacer tube means is glued to the first optical fiber and to the outer tube.

18 Claims, 2 Drawing Sheets

METHOD OF AFFIXING OPTICAL FIBER TO COUPLER

BACKGROUND OF THE INVENTION

This invention relates to 1×N fiber optic couplers (N>2) that are capable of coupling substantially equal amounts of power from an input optical fiber to three or more output optical fibers; it also relates to methods of making such couplers.

Methods of making 1×N couplers are disclosed in U.S. Pat. No. 5,017,206 and in U.S. patent application Ser. No. 07/913,390 (D. L. Weidman 6) filed Jul. 15, 1992, now U.S. Pat. No. 5,268,979.

Fiber optic couplers have been formed by assembling a coupler preform comprising two concentric glass tubes having a gap therebetween. The shape and/or size of the inner tube relative to the shape and/or size of the outer tube is such that a plurality of output optical fibers can be equally spaced in the gap. An input optical fiber is disposed in an bore in the inner tube. The input and output fibers extend through the midregion of the resultant coupler preform. The midregion is heated to collapse it about the fibers, and the central portion of the midregion is stretched to reduce the diameter thereof over a predetermined length.

The collapsing of the tube midregion causes the optical fibers just outside the collapsed region to be weakened. This weakened region occurs a few millimeters from the fully collapsed region in the uncollapsed portion of the bore of the outer tube. Pulling on the fiber pigtails extending from the coupler can cause fiber breakage. Moreover, under severe thermal cycling, the weakened region of the fibers has been known to break, primarily because of a thermal coefficient of expansion mismatch between the glue and the glass coupler components.

It has therefore been conventional practice to glue the ends of the outer tube to the fibers to provide those portions of the fibers that extend from the coupler with adequate pull strength. However, since the spacing between the input fiber and the inner glass tube is extremely small, glue applied to an end of the inner tube cannot flow between that tube and the input fiber. Therefore, an insufficient amount of glue contacts the input fiber to provide it adequate pull strength.

SUMMARY OF THE INVENTION

It is therefore an object of the present invention to provide a method of making robust overclad 1×N fiber optic couplers which can reliably withstand temperature extremes and mechanical influences such as pulling on the fiber pigtails extending therefrom.

The present invention relates to a method for making a 1×N fiber optic coupler. The method is of the type that includes the steps of assembling a coupler preform, collapsing the midregion of the coupler preform onto the fibers, stretching the central portion of the midregion to reduce its diameter, and affixing the first fiber and the N fibers to the outer tube.

The coupler preform includes spacer tube means surrounded by an outer glass tube that is concentric with the spacer tube means. A first portion of a first optical fiber is disposed in a bore in the spacer tube means, the remaining portion of the first fiber extending beyond a first end of the outer tube. The first portions of N optical fibers are disposed between the outer tube and the spacer tube means, the remaining portions of the N fibers extending beyond a second end of the outer tube. The first portions of the first fiber and the N fibers extend through the midregion of the resultant coupler preform.

In accordance with the present invention, the step of assembling a coupler preform comprises threading the first fiber through the spacer tube means and affixing the first fiber to that end of the spacer tube means adjacent the remaining portion of the first fiber. Further, the step of affixing the first fiber to the outer tube comprises affixing the spacer tube means to the outer tube.

The resultant fiber optic coupler comprises an elongated glass body having a solid midregion and first and second opposite end portions which respectively extend from the midregion to the first and second ends of the body. The body includes spacer tube means surrounded by an outer glass tube that is concentric with the spacer tube means. A first portion of a first optical fiber is disposed in a bore in the spacer tube means, the remaining portion of the first fiber extending beyond the first end of the body. The first portions of N optical fibers are disposed between the outer tube and the spacer tube means, the remaining portions of the N fibers extending beyond the second end of the body. The first portions of the first fiber and the N fibers extend through the midregion of the body. The first fiber, spacer means, N fibers and outer tube are fused together in the midregion of the body, and the central portion of the midregion has a diameter smaller than the diameter of the ends of the glass body. The first fiber is glued to that end of the spacer tube means adjacent the remaining portion of the first fiber, and the spacer tube means is glued to the first end of the outer tube.

DESCRIPTION OF THE PREFERRED EMBODIMENTS

The drawings are not intended to indicate scale or relative proportions of the elements shown therein.

In the process of making 1×N overclad fiber optic couplers (N>2), a portion of the protective coating is removed from the ends of N+1 fibers. The uncoated portion of a first fiber is disposed within the bore of a glass tube, the remainder of the fiber extending from a first end of the tube. The uncoated portion of the N fibers are disposed within the bore and are equally spaced around the first fiber, the remainder of the N fibers extending from a second end of the tube. The uncoated portions of all fibers extend through the tube midregion which is evacuated and heated to collapse it around the fibers. The central portion of the collapsed midregion is stretched to that diameter and coupling length which is necessary to obtain the desired coupling.

For a number of reasons, it can be advantageous to employ a spacer tube between the input and output fibers. For example, a spacer tube can be employed to equally space three or four output fibers around an input fiber as taught in U.S. Pat. No. 5,017,206. Further, since only six optical fibers can fit around another fiber of equal diameter, a glass spacer tube can be placed between an input fiber and seven or more output fibers. The refractive index of the spacer tube is preferably equal to that of the outer tube or between that of the outer tube and that of the fiber cladding.

Figure 1:
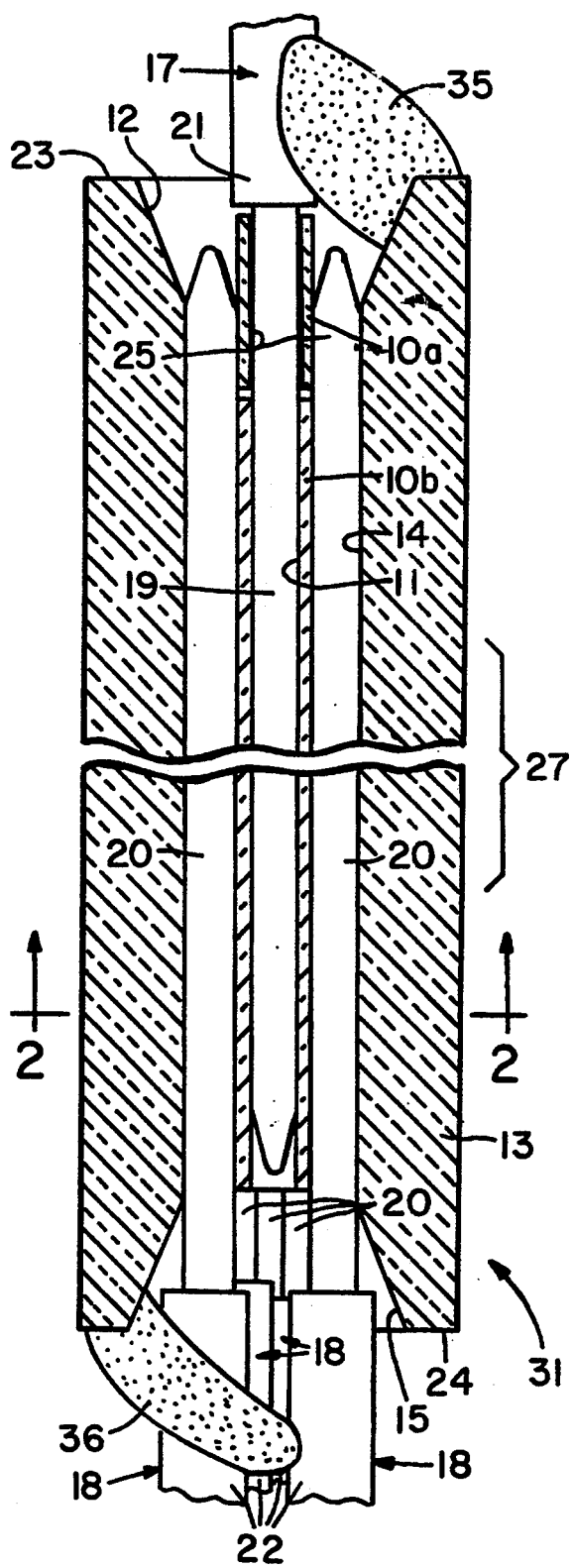
FIG. 1 is a cross-sectional view of a coupler preform.
Figure 2:
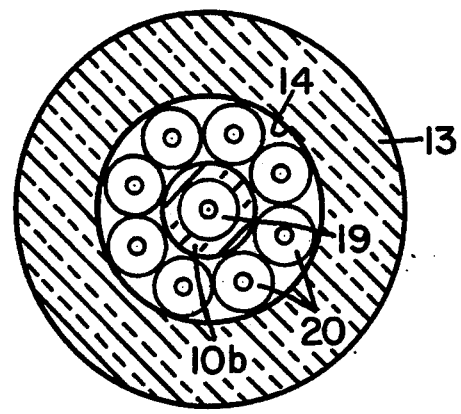
FIG. 2 is a cross-sectional view taken along lines 2—2 of FIG. 1.

By way of example, FIGS. 1 and 2 illustrate a method of assembling a coupler preform 31 that can be formed into a 1×8 fiber optic coupler. The protective coating is stripped from the ends of nine coated fibers and the endfaces are provided with antireflection terminations. Each fiber includes a core and cladding. The uncoated end portions of eight optical fibers 18 are inserted into bore 14 of overclad tube 13 in the arrangement shown in FIG. 2, coatings 22 ending within funnel 15 as shown in FIG. 1.

A drop of glue is applied to a portion of the uncoated end of the ninth fiber 19 adjacent coating 21, and it is inserted into a short piece 10a of spacer tube. The glue 25 then occupies the space between the fiber and spacer tube as shown by the dark line between them. After the glue is cured, the remaining uncoated portion of fiber 19 is inserted into a piece 10b of spacer tube. Tube 10b is not glued to fiber 19; the space between them can therefore be evacuated. Tube 10a is sufficiently short that the end thereof opposite coating 21 terminates in that region of tube 13 outside midregion 27. Tube 10b is sufficiently long that it extends entirely through midregion 27. The resultant combination of fiber 19 and tubes 10a and 10b is inserted through funnel 12 and into the cavity at the center of fibers 20 until coating 21 is within funnel 12.

A drop 36 of glue is applied to the outer circumference of coated fibers 18 to tack them to endface 24, the glue being applied in such a manner that access from to bore 14 is not blocked. A drop 35 of glue similarly secures fiber 17 to endface 23.

Figure 3:
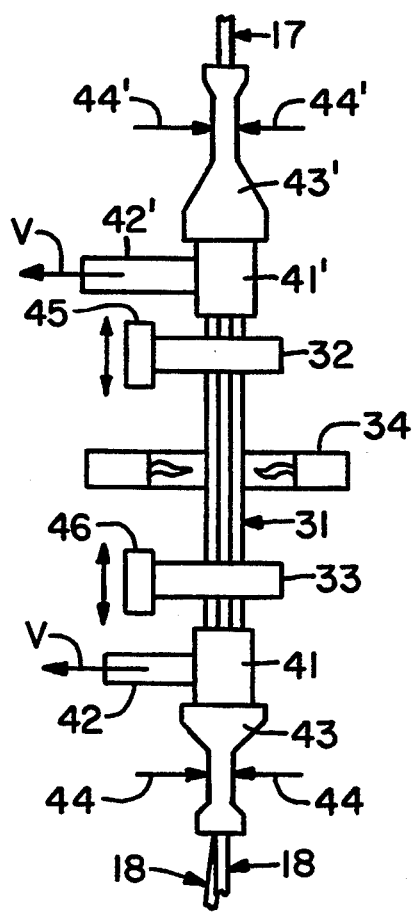
FIG. 3 is a schematic illustration of an apparatus for collapsing a capillary tube, stretching the midregion thereof, and optionally supporting it during the glue application process.

Coupler preform 31 can be further processed in the draw apparatus of FIG. 3. Preform 31 is inserted through ring burner 34 and is clamped to draw chucks 32 and 33 which are mounted on motor controlled stages 45 and 46. The fibers are threaded through the vacuum attachments 41 and 41', which are then sealed to the ends of preform 31. Typical vacuum attachments are disclosed in U.S. Pat. No. 5,017,206 which is incorporated herein by reference. Vacuum is supplied to tube 41 through line 42. One end of a length of thin rubber tubing 43 is attached to that end of vacuum attachment 41 opposite preform 31; the remaining end of the tubing extending within tube clamping means (not shown). Upper vacuum attachment 41' is similarly associated with line 42', tubing 43' and tube clamping means. The coated portions of the fibers extend from tubing 43 and 43'. When air pressure is directed against tubing 43 and 43' as indicated by arrows 44, 44', to clamp the tubing against the fibers extending therethrough, bore 14, as well as the interstices between the fibers and spacer tubing therein, is evacuated through lines 42 and 42'.

Figure 4:
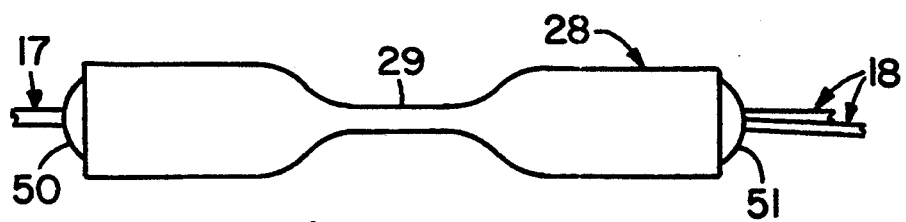
FIG. 4 shows a coupler preform after it has been stretched and sealed at its ends.
Figure 5:
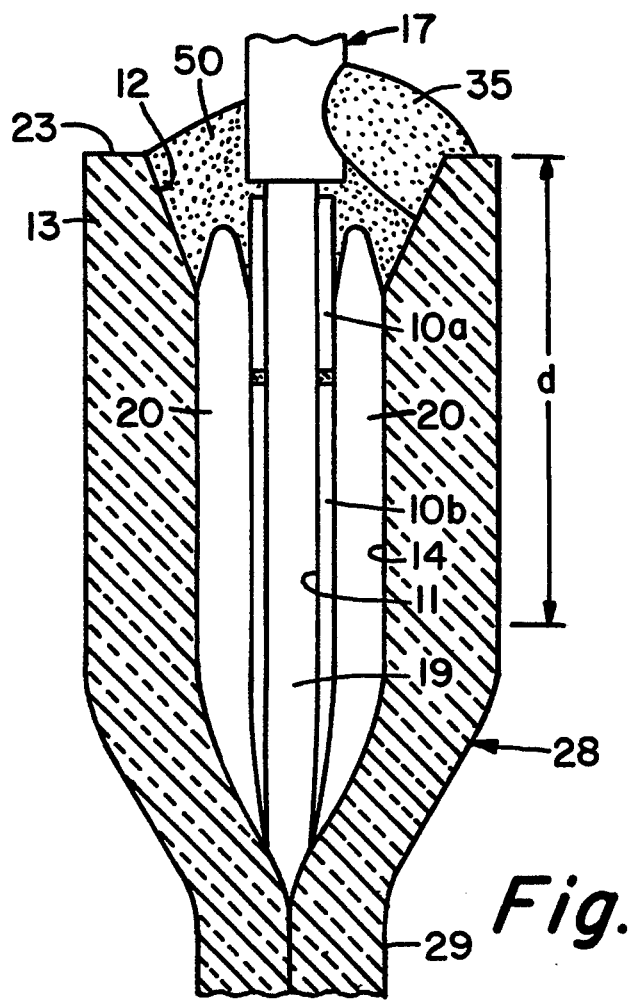
FIG. 5 is a partial cross-sectional view illustrating one half of coupler 28 of FIG. 4.

While preform 31 is evacuated, ring burner 34 heats tube 13, causing midregion 27 to collapse onto optical fibers 20. Thereafter, the center of the collapsed region is heated, and stages 45 and 46 pull in opposite directions to elongate preform 31 to form fiber optic coupler 28 having neckdown region 29 (FIGS. 4 and 5).

The open space in funnels 12 and 15 is then filled with glue 50 and 51, respectively, to increase the pull strength of the optical fiber pigtails extending from the ends of the coupler. Glue can be applied by filling a syringe with glue and inserting its applicator needle into a funnel. A sufficient amount of glue is injected into the funnel to cover the bare regions of the fibers that extend into the funnel. Before the glue is cured, a sufficient amount of time is allowed to pass to enable the glue to wick down the wall of the funnel and bore adjacent the optical fibers. By "wick" is meant that the glue flows by capillary action between each fiber and the adjacent surface of the bore to form elongated beads which affix the fibers to bore 14. Referring to FIG. 5, glue 50 applied to funnel 12 might wick down bore 14 a distance d. Glue 50 secures tube 10a to tube 13, and tube 13 is glued to fiber 19. Therefore, an axial force applied to fiber 17 is dissipated and does not reach the weakened portion of the fiber in the uncollapsed portion of bore 14 adjacent the collapsed midregion.

The following specific example concerns a method of making a 1×8 splitter. A glass tube 13 having a 3.8 cm length, 2.8 mm outside diameter, and 465 $\mu$m longitudinal bore diameter was employed; it was formed of silica doped with about 0.5 wt. % $B_2O_3$, the composition being relatively uniform throughout its radius. Each of the funnels 12 and 15 was formed by flowing the gas phase etchant $NF_3$ through the tube while uniformly heating the end of the tube. The depths of funnels 12 and 15 were about 2 mm and 3 mm, respectively, and the maximum diameter of both funnels was about 1.8 mm.

Figure 6:
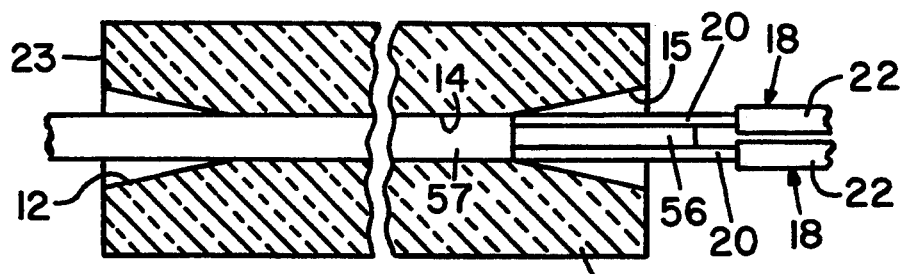
FIG. 6 is a cross-sectional view of an overclad tube illustrating a fiber insertion step.

The spacer tubes had an outside diameter of 205 $\mu$m and an inside diameter of 130 $\mu$m. A length of coated spacer tube was used as a tool for initially inserting the eight fibers around the surface of the tube bore. A length of spacer tube was provided with a urethane acrylate coating having an outside diameter of 450 $\mu$m. About 2.5 cm of coating was stripped from the end of a piece 56 of spacer tube (FIG. 6). The uncoated end of the spacer tube was inserted a sufficient distance into end 23 of tube 13 to ensure that the end of coating 57 was located in bore 14 a short distance beyond the narrow end of funnel 15.

Nine 1.5 m long optical fibers were provided with stripped ends having antireflection terminations by the following technique. A 6 cm long section of coating was removed from the end of each fiber. A flame was directed at the center of the stripped region of fiber, while the end of the fiber was pulled and severed to form a tapered end. The tip of the fiber was heated by a burner flame to cause the glass to recede and form a rounded endface, the diameter of which was equal to or slightly smaller than the original uncoated fiber diameter. The resultant stripped end region was about 3.2 cm long.

Eight fibers 20 were inserted into bore 14 around spacer tube 56 until they contacted coating 57. The eight fibers were moved together toward end 23 of tube 13 until the fiber coatings 22 were in funnel 15. The coated spacer tube was then removed. Spacer tubes 10a and 10b were cut to lengths of approximately 6 mm and 28 mm, respectively. The tubes were composed of $SiO_2$ doped with 0.4 wt. % $B_2O_3$.

A small amount of No. 2728 UV curable epoxy sold by Electrolite Corp. of Danbury, Conn. was applied to the stripped region of fiber 19 near coating 21. Spacer tube 10a was slid onto the fiber until it was positioned adjacent the end of coating 21, and the epoxy was cured with UV light. Spacer tube 10b was then threaded onto fiber 19. The resultant combination was inserted through funnel 12 and into the cavity at the center of the eight fibers 20 from which spacer tube 56 had been removed. The insertion step was continued until the end of coating 21 was within funnel 12. A small amount of No. 2728 UV-curable epoxy was applied as described above to hold the fibers in place.

Vacuum was applied to one end of the tube bore and several drops of ethyl alcohol were applied to the other end to wash out debris. The preform was then put into the apparatus of FIG. 3 as described above, and a vacuum of 18 cm of mercury was connected to both ends of the tube bore.

With gas and oxygen flowing to the burner at rates of 0.55 slpm and 1.10 slpm, respectively, the flame heated the tube for about 18 seconds to collapse the matrix glass onto the fibers. After the tube cooled, with flow rates of gas and oxygen remaining the same; the burner was reignited. The flame heated the central portion of the collapsed region, and after 10 seconds, the supply of oxygen to burner 34 was turned off. Stages 45 and 46 were pulled in opposite directions at a combined rate of 1.0 cm/sec until the central portion of midregion 27 was stretched 0.8 cm.

The stretching distance was determined as follows. A coupler was initially elongated by some distance determined by previous experience. The optical characteristics of the resultant device were measured, and the stretching or elongation distance of the subsequently made coupler was adjusted in such a manner as to more nearly achieve the desired characteristics. By this process, the optimal stretching distance was achieved. Thereafter, all couplers of that type were stretched the optimal distance in order to achieve the desired optical characteristics. However, process parameters such as the elongation distance can be fine tuned as a result of optical characterization of the produced couplers.

After the coupler cooled, the vacuum lines were removed. Clamps 44 and 44' were released from the flexible vacuum hoses 43 and 43', and nitrogen was supplied to tubes 42 and 42'. The turbulence created by the nitrogen flowing through tubes 43 and 43' enhanced the release of the fiber from those tubes. Upon completion of the nitrogen purge, vacuum attachments 41 and 41' were removed. The coupler remained in the chucks during the application of glue to funnels 12 and 15.

A Milwaukee model #1400 precision hot tool (heat gun) was turned on and allowed to warm up. The heat gun was aimed at upper region of the coupler between burner 34 and chuck 32 for about 15 seconds, a distance of 14 cm being maintained between the gun and the coupler body. A syringe was filled with No. 2728 UV-curable epoxy. The applicator needle was inserted into the upper funnel 12 of the coupler preform, and the needle was carefully manipulated into the bottom region of the funnel. A sufficient amount of epoxy 51 was injected into the funnel to fill it and cover the bare fiber. Care was taken to minimize the amount of glue that extended exterior to the funnel. After 2 minutes had passed, the epoxy in lower funnel 15 was subjected to a UV light source. The 2 minute lapse of time prior to initiation of the UV epoxy permits the glue to wick beyond the funnel into the bore. The end of the UV wand was 3.25 mm from the surface of coupler 28.

The heating, epoxy application and curing process was then repeated at the lower funnel 15. The coupler body was then released from chucks 32 and 33. To ensure full initiation of the epoxy, the coupler was placed on a white background and was exposed to UV light from a Bondwand UV curing wand for a minimum of 15 minutes.

Couplers made in accordance with this example generally exhibited a minimum excess device loss of about 1.0 dB at 1430 nm. The lowest measured excess loss was 0.8 dB.

The mechanical reliability of overclad 1×8 fiber optic couplers made in accordance with this example have shown significant improvement over overclad fiber optic couplers glued by a "standard technique" whereby a coupler is made by a process that is identical to that described above except that a single spacer tube is employed, and it is not glued to the input fiber.

Prior to using the improvement disclosed herein, about one hundred couplers were glued by the aforementioned standard technique. When subjected to a thermal cycle between −40° C. and +85° C., failure rate was approximately 10-15%.

When the gluing method of the specific example was employed, no breakage occurred.

Informal testing has also shown a noticable improvement in pigtail pull strength.

An alternative embodiment, in which a single spacer tube is glued to the input fiber, was attempted. The length of the single tube equaled the combined lengths of tubes 10a and 10b of FIG. 1. The resultant couplers were commercially unacceptable since losses were too high. It is thought that failure was caused by the following circumstances. It is an imperfect vacuum that is generated between the spacer tube and fiber 19 during the tube collapse step. As the midregion of the outer tube collapses, the central part of the spacer tube collapses on the inner fiber and traps a very small amount of air between that point and the point where the spacer tube and fiber 19 that are glued together. Thereafter, the collapsed region begins to enlarge longitudinally toward the glued region as the heat begins to spread. This reduces the volume of the region of trapped air, thereby causing a distortion of the coupling region which increases loss.

It may be possible to form low loss couplers by a single tube technique by improving the vacuum applied to the coupler preform during the collapse step. Moreover, care must be taken to apply a sufficiently small amount of glue to the central fiber that when the single spacer tube is threaded over it, the glue will not wick too far down the narrow space between the tube and fiber 19. If the glue extends too close to midregion 27 of tube 13, its temperature will become too high during the collapse step, and it will burn or otherwise generate gases that will expand and distort the device being made.

What is claimed is:

1. In a method of making a fiber optic coupler comprising the steps of assembling a coupler preform including spacer tube means surrounded by an outer glass tube that is concentric with said spacer tube means, a first portion of a first optical fiber disposed in a bore in said spacer tube means, the remaining portion of said first fiber extending beyond a first end of said outer tube, the first portions of N optical fibers disposed between said outer tube and said spacer tube means, the remaining portions of said N fibers extending beyond a second end of said outer tube, the first portions of said first fiber and said N fibers extending through the midregion of the resultant coupler preform, collapsing the midregion of said coupler preform onto said fibers, stretching the central portion of said midregion to reduce the diameter thereof, and affixing said first fiber and the N fibers to said outer tube, the improvement wherein the bore of said spacer tube means forms an inner surface; wherein the step of assembling a coupler preform comprises threading said first fiber through said spacer tube means and affixing the bare surface of said first fiber to the inner surface of that end of said spacer tube means adjacent the remaining portion of said first fiber; and wherein the step of affixing said first fiber to said outer tube comprises affixing said spacer tube means to said outer tube.

2. A method in accordance with claim 1 wherein said spacer tube means comprises a first spacer tube disposed around and affixed to said first optical fiber, said first spacer tube being located outside the midregion of said coupler preform, and a second spacer tube disposed around said first optical fiber axially adjacent said first spacer tube and extending through the midregion of said coupler preform.

3. A method in accordance with claim 2 wherein said first spacer tube is shorter than said second spacer tube.

4. A method in accordance with claim 1 wherein the step of assembling a coupler preform comprises assembling a preform wherein each of said N fibers is disposed immediately adjacent two other of said N fibers.

5. A method in accordance with claim 1 wherein the step of assembling a coupler preform comprises assembling a preform wherein the radial spacing between said outer tube and said spacer tube means is azimuthally homogeneous, whereby its thickness at any azimuthal position is sufficient to accept one of said N fibers.

6. A method in accordance with claim 1 wherein said first optical fiber and said N optical fibers having protective coatings thereon, and wherein the step of assembling a coupler preform comprises stripping the protective coating from said first portions of said first optical fiber and said N optical fibers, applying glue to that part of the stripped portion of said first fiber that is adjacent its coating, sliding said spacer tube means over said first fiber so that said glue is located between said first fiber and said spacer tube, inserting the stripped portions of said N optical fibers into the bore of said outer tube to form an array in which said N fibers are equally spaced around said bore, a cavity existing within said outer tube radially inwardly from said N fibers, inserting the assembly of said spacer tube means and said first fiber into said cavity so that said first fiber, said N fibers and said second spacer tube extend through the midregion of said overclad tube.

7. A method in accordance with claim 6 wherein said spacer tube means comprises a first spacer tube disposed around and affixed to said first optical fiber, said first spacer tube being located outside the midregion of said coupler preform, and a second spacer tube disposed around said first optical fiber axially adjacent said first spacer tube and extending through the midregion of said coupler preform.

8. A method in accordance with claim 7 wherein said first spacer tube is shorter than said second spacer tube.

9. A method in accordance with claim 1 wherein that portion of said spacer tube means that is affixed to said first fiber lies outside said midregion.

10. A method of making a fiber optic coupler comprising the steps of providing a first coated optical fiber and N coated optical fibers, each having coating stripped from an end thereof, providing spacer tube means having an inner surface, threading said spacer tube means onto the stripped portion of said first optical fiber and affixing the inner surface of said spacer tube means to that portion of said first fiber adjacent its coating thereafter, inserting the stripped portions of said N optical fibers into the bore of said outer tube to form an array in which said N fibers are equally spaced around said bore, a cavity existing within said outer tube radially inwardly from said N fibers, inserting the assembly of said spacer tube means and said first fiber into said cavity so that said first fiber, said N fibers and said second spacer tube extend through the midregion of said overclad tube thereafter, collapsing the midregion of said overclad tube onto said fibers, stretching the central portion of said midregion to reduce the diameter thereof, and affixing said first spacer tube to said overclad tube.

11. A method in accordance with claim 10 wherein said spacer tube means comprises a first spacer tube disposed around and affixed to said first optical fiber, said first spacer tube being located outside the midregion of said coupler preform, and a second spacer tube disposed around said first optical fiber axially adjacent said first spacer tube and extending through the midregion of said coupler preform.

12. A method in accordance with claim 11 wherein said first spacer tube is shorter than said second spacer tube.

13. A method in accordance with claim 10 wherein the step of affixing said spacer tube means to said first fiber comprises applying glue to said first fiber and thereafter, sliding said spacer tube means over said first fiber.

14. A fiber optic coupler comprising an elongated glass body having a solid midregion and first and second opposite end portions which respectively extend from said midregion to the first and second ends of said body, said body including spacer tube means surrounded by an outer glass tube that is concentric with said spacer tube means, a first portion of a first optical fiber disposed in a bore in said spacer tube means, the remaining portion of said first fiber extending beyond said first end of said body, the first portions of N optical fibers disposed between said outer tube and said spacer tube means, the remaining portions of said N fibers extending beyond said second end of said body, the first portions of said first fiber and said N fibers extending through the midregion of said body, said first fiber, spacer means, N fibers and outer tube being fused together in the midregion of said body, the central portion of said midregion having a diameter smaller than the diameter of the remainder of said glass body, the cores of said optical fibers being closer together in the central portion of said midregion than in the remainder of said glass body, the improvement wherein the bore of said spacer tube means forms an inner surface; wherein the bare surface of said first fiber is glued to the inner surface of that end of said spacer tube means adjacent the remaining portion of said first fiber; and wherein said spacer tube means is glued to the first end of said outer tube.

15. A coupler in accordance with claim 14 wherein each of said N fibers is in contact with the two adjacent ones of said N fibers.

16. A coupler in accordance with claim 14 wherein said spacer tube means comprises a first spacer tube disposed around and affixed to said first optical fiber, said first spacer tube being located outside the midregion of said coupler preform, and a second spacer tube disposed around said first optical fiber axially adjacent said first spacer tube and extending through the midregion of said coupler preform.

17. A coupler in accordance with claim 16 wherein said first spacer tube is shorter than said second spacer tube.

18. In a method of making a fiber optic coupler comprising the steps of assembling a coupler preform including spacer tube means surrounded by an outer glass tube that is concentric with said spacer tube means, a first portion of a first optical fiber disposed in a bore in said spacer tube means, the remaining portion of said first fiber extending beyond a first end of said outer tube, the first portions of N optical fibers disposed between said outer tube and said spacer tube means, the remaining portions of said N fibers extending beyond a second end of said outer tube, the first portions of said first fiber and said N fibers extending through the midregion of the resultant coupler preform, collapsing the midregion of said coupler preform onto said fibers, stretching the central portion of said midregion to reduce the diameter thereof, and affixing said first fiber and the N fibers to said outer tube, the improvement wherein said spacer tube means comprises a first spacer tube disposed around and affixed to that end of said first portion of said first optical fiber that is adjacent the remaining portion of said first optical fiber, said first spacer tube being located outside the midregion of said coupler preform, and a second spacer tube disposed around said first optical fiber axially adjacent said first spacer tube and extending through the midregion of said coupler preform, and wherein the step of affixing said first fiber to said outer tube comprises affixing said spacer tube means to said outer tube.

* * * * *